United States Patent [19]

Watanabe

[11] Patent Number: 4,994,228

[45] Date of Patent: Feb. 19, 1991

[54] METHOD FOR RELEASING MOLDED SYNTHETIC RESIN PRODUCTS FROM A MOLD

[75] Inventor: Seiichi Watanabe, Kanagawa, Japan

[73] Assignee: Fuji Photo Film Co., Ltd., Kanagawa, Japan

[21] Appl. No.: 479,819

[22] Filed: Feb. 13, 1990

[30] Foreign Application Priority Data

Feb. 16, 1989 [JP] Japan .................................. 1-36929

[51] Int. Cl.$^5$ .............................................. B29C 45/43
[52] U.S. Cl. .................................... 264/335; 425/556; 425/437
[58] Field of Search ..................... 264/335, 334, 336; 425/554, 556, 437

[56] References Cited

U.S. PATENT DOCUMENTS 4,364,895 12/1982 Underwood ......................... 425/556
4,812,281 3/1989 Beard et al. ......................... 264/335

FOREIGN PATENT DOCUMENTS 56-105941 8/1981 Japan ............................... 264/335
59-45110 3/1984 Japan .
59-176029 10/1984 Japan .
62-261416 11/1987 Japan ............................... 264/335

Primary Examiner—Jill L. Heitbrink
Attorney, Agent, or Firm—Sughrue, Mion, Zinn, Macpeak & Seas

[57] ABSTRACT

A gas accumulation space, in which a predetermined amount of a gas is to accumulate and which communicates with said gas passageway, is located in a mold. After a cavity of the mold has been filled with a synthetic resin but before the mold is opened, the gas is fed into the gas passageway and the gas accumulation space until the pressure of the gas in the gas passageway and the gas accumulation space reaches a predetermined value. After the pressure of the gas in the gas passageway and the gas accumulation space has reached the predetermined value, the gas passageway is closed at a position upstream from where the gas passageway communicates with the gas accumulation space. When the mold clamping force is released in the course of opening the mold, the gas, which has accumulated in the gas accumulation space and parts of the gas passageway located downstream from the position at which the gas passageway has been closed, is caused to be jetted to a position between the molded synthetic resin product and the molding surface of the mold in order to release the molded synthetic resin product from the mold.

17 Claims, 1 Drawing Sheet

METHOD FOR RELEASING MOLDED SYNTHETIC RESIN PRODUCTS FROM A MOLD

BACKGROUND OF THE INVENTION

1. Field of the Invention

This invention relates to a method for releasing a molded synthetic resin product from a mold. This invention particularly relates to a method for releasing a molded synthetic resin product from a mold wherein a molded synthetic resin product, such as an optical disk sheet, which is required to exhibit a high accuracy in its flatness, is released from a mold without being deformed or damaged.

2. Description of the Prior Art

In general, when molded synthetic resin products are released from molds after being molded in the molds with injection molding processes, the molded synthetic resin products are knocked out of the molds with mechanical means such as ejector pins and ejector sleeves. However, when thin sheet-like molded products, such as optical disk sheets, are released from molds with such methods, the molded products easily become deformed. Accordingly, air pressure has heretofore been used to release the thin sheet-like molded products from the molds.

For example, in Japanese Unexamined Patent Publication No. 59(1984)-45110, a method is disclosed wherein, in the course of opening the mold, compressed air is jetted to the bottom surface of a female mold half, an edge of a male mold half, and a peripheral surface of the female mold half, in order to release a molded product from the mold with the pressure of the compressed air. Also, in Japanese Unexamined Patent Publication No. 59(1984)-176029, a method is disclosed wherein the air is jetted to an outer circumferential edge of a molded synthetic resin product on a mold until the outer circumferential part of the molded synthetic resin product floats away from the mold, and thereafter the center part of the molded synthetic resin product is released from the mold.

A product which has been molded with an injection molding process must be released from both a fixed mold half and a movable mold half, which together constitute the mold. In cases where air pressure is used to release the molded product from the mold, in order to release the molded product from the fixed mold half, air is introduced from the side of the fixed mold half to a position between a molding surface of the fixed mold half and the molded product. In order to release the molded product from the movable mold half, air is introduced from the side of the movable mold half to a position between a molding surface of the movable mold half and the molded product.

At the time the molded product is released from the mold, the temperature of the molded product is considerably high. Therefore, in cases where the molded product is a thin sheet-like product such as an optical disk sheet, the molded product, after it has been released from the mold, easily becomes deformed due to factors such as the timing with which the air is jetted to positions between the molding surfaces of the mold and the molded product, the pressure of the air, and the time during which the air is jetted. In order to prevent the molded product from being deformed, various attempts have heretofore been made to improve the accuracy of the air pressure, the accuracy of the timing with which the jetting of the air starts, the accuracy of the timing with which the jetting of the air stops, or the like. By way of example, a method has heretofore been employed wherein the molding machine is provided with timers, the jetting of the air is started and stopped with the timers, and the start and stop times are set with a molding program.

However, even when the timing with which the jetting of the air starts and the timing with which the jetting of the air stops are controlled with timers, the surface accuracy of the molded products varies among those molded with different molding shots.

SUMMARY OF THE INVENTION

The primary object of the present invention is to provide a method for releasing a molded synthetic resin product from a mold, wherein a molded synthetic resin product is released from a mold without being deformed, for example, without being warped or without becoming wavy.

Another object of the present invention is to provide a method for releasing a molded synthetic resin product from a mold, wherein molded synthetic resin products are released from a mold so that the variation in the shapes of the molded synthetic resin products among molding shots is minimized.

The inventor conducted a study to find the reasons why the surface accuracy of the molded synthetic resin products varies among those molded with different molding shots. The study revealed that the three problems described below are the primary causes of the variation in the surface accuracy of the molded synthetic resin products.

(1) In general, an error of approximately 0.1 second occurs between the molding processes which are controlled with the molding program. Therefore, the time at which the jetting of the air starts does not accurately coincide with the time at which the mold opens.

(2) The air pressure in air passageways, through which the air is introduced to positions between molding surfaces of the mold, is equal to the atmospheric pressure until an air valve opens and jets the air. When the air valve opens, the air pressure in the air passageways increases. However, the time at which the jetting of the air starts and the time at which the mold opens deviate slightly from each other, and the extent of the deviation varies among the molding shots. Therefore, the rate with which the air pressure in the air passageways increases varies among the molding shots.

(3) For the reasons described in (2), the air pressure obtained at the instant the molded product is released varies among the molding shots.

The inventor also carried out various experiments and found that in order to keep the surface accuracy of the molded synthetic resin products high, it is necessary to increase the pressure of the air which is used to release the molded synthetic resin product from the molding surfaces of the mold as soon as possible immediately after the mold is opened. It was also found that the air has the effect of cooling the molded synthetic resin product, and therefore the jetting of the air must be stopped as early as possible after the molded synthetic resin product has been released from the mold.

Accordingly, the present invention provides a method for releasing a molded synthetic resin product from a mold wherein a gas is fed through a gas passageway to a position between a molded synthetic resin product, which has been molded in a mold with an injection molding process, and a molding surface of the mold in order to release the molded synthetic resin product from the mold, the method for releasing a molded synthetic resin product from a mold comprising the steps of:

(i) providing a gas accumulation space in which a predetermined amount of said gas is to accumulate and which communicates with said gas passageway, (ii) feeding said gas into said gas passageway and said gas accumulation space until the pressure of said gas in said gas passageway and said gas accumulation space reaches a predetermined value after a cavity of said mold has been filled with a synthetic resin but before said mold is opened, (iii) after the pressure of said gas in said gas passageway and said gas accumulation space has reached the predetermined value, closing said gas passageway at a position upstream from where said gas passageway communicates with said gas accumulation space, and (iv) when mold clamping force is released in the course of opening said mold, causing said gas, which has accumulated in said gas accumulation space and the parts of said gas passageway downstream from said position at which said gas passageway has been closed, to be jetted to a position between said molded synthetic resin product and said molding surface of said mold in order to release said molded synthetic resin product from said mold.

With the method for releasing a molded synthetic resin product from a mold in accordance with the present invention, a gas is fed into the gas passageway and the gas accumulation space until the pressure of the gas in the gas passageway and the gas accumulation space reaches a predetermined value. The gas is supplied after the cavity of the mold has been filled with a synthetic resin, but while the molded product of the synthetic resin is being cooled in the mold before the mold is opened. When the molded synthetic resin product is being cooled in the mold, a gas jetting opening, from which the gas accumulated in the gas passageway and the gas accumulation space is jetted to the position between the molded synthetic resin product and the molding surface of the mold, is closed by the surface of the molded synthetic resin product. This is because the molded synthetic resin product is being pushed against the molding surface of the mold by the mold clamping force. Therefore, when the gas is fed into the gas passageway and the gas accumulation space while the molded synthetic resin product is being cooled in the mold before the mold is opened, the gas is not jetted to the position between the molded synthetic resin product and the molding surface of the mold, and the pressure of the gas increases in the gas passageway and the gas accumulation space. After the pressure of the gas in the gas passageway and the gas accumulation space has reached the predetermined value, the gas passageway is closed at a position upstream from where the gas passageway communicates with the gas accumulation space. Therefore, before the mold is opened, a predetermined amount of the gas has accumulated at a predetermined pressure in the gas accumulation space and the parts of the gas passageway located downstream from the position at which the gas passageway has been closed. When the mold clamping force is released and the mold begins opening, the force which had caused the surface of the molded synthetic resin product to close the gas jet opening is released. Therefore, the gas, which has accumulated in the gas accumulation space and the parts of the gas passageway located downstream from the position at which the gas passageway has been closed, is jetted instantaneously from the gas jet opening and releases the molded synthetic resin product from the mold. Therefore, the time at which the gas is jetted accurately coincides with the time at which the mold opens. Also, the pressure of the jetted gas is defined by the pressure of the gas which has accumulated in the gas accumulation space and the parts of the gas passageway located downstream from the position at which the gas passageway has been closed. Therefore, the pressure of the jetted gas is constant for a plurality of molding shots. Additionally, gas having the desired pressure can be jetted immediately after the mold has begun opening. Moreover, when the volume of the gas accumulation space and the volume of the parts of the gas passageway located downstream from the position at which the gas passageway has been closed are set to appropriate values, the jetting of the gas can be stopped immediately after the molded synthetic resin product has been released from the mold.

Therefore, with the method for releasing a molded synthetic resin product from a mold in accordance with the present invention, the molded synthetic resin products, after they have been released from the mold, do not become warped or wavy and are free of any deformation. Also, the shapes of the molded synthetic resin products do not vary for a plurality of molding shots.

DESCRIPTION OF THE PREFERRED EMBODIMENTS

The present invention will hereinbelow be described in further detail with reference to the accompanying drawings.

Figure 1:
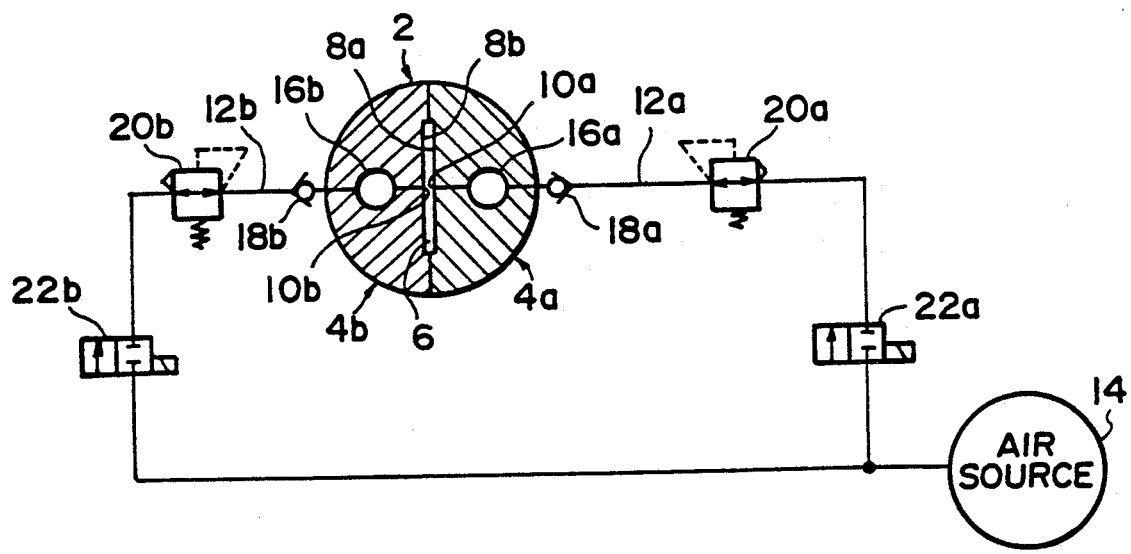
FIG. 1 is a schematic view showing a mold for carrying out an embodiment of the method for releasing a molded synthetic resin product from a mold in accordance with the present invention.

FIG. 1 is a schematic view showing an injection mold for molding optical disk sheets, wherein an embodiment of the method for releasing a molded synthetic resin product from a mold in accordance with the present invention is employed.

With reference to FIG. 1, a mold 2 is constituted of a fixed mold half 4a and a movable mold half 4b. The fixed mold half 4a and the movable mold half 4b respectively have molding surfaces 8a and 8b which define a mold cavity 6. An air jet opening 10a is formed in the molding surface 8a, and an air jet opening 10b is formed in the molding surface 8b. The air jet opening 10a is connected to an air source 14, which supplies compressed air and which may be constituted of an air compressor, via an air passageway 12a. The air jet opening 10b is connected to the air source 14 via an air passageway 12b. The fixed mold half 4a is provided with a gas accumulation space 16a which communicates with the air passageway 12a and which has a predetermined volume. Also, the movable mold half 4b is provided with a gas accumulation space 16b which communicates with the air passageway 12b and which has a predetermined volume. A shut-off valve 18a constituted of a check valve is located at a predetermined position upstream from where the air passageway 12a communicates with the air accumulation space 16a. that is, the shut-off valve 18a is located at a predetermined position between where the air passageway 12a communicates with the air accumulation space 16a and the air source 14. The shut-off valve 18a prevents the air, which has accumulated in the air accumulation space 16a and parts of the air passageway 12a located downstream from the shut-off valve 18a, from returning to parts of the air passageway 12a upstream from the shut-off valve 18a. Also, a shut-off valve 18b constituted of a check valve is located at a predetermined position upstream from where the air passageway 12b communicates with the air accumulation space 16b. That is, the shut-off valve 18b is located at a predetermined position between where the air passageway 12b communicates with the air accumulation space 16b and the air source 14. The shut-off valve 18b prevents the air, which has accumulated in the air accumulation space 16b and parts of the air passageway 12b located downstream from the shut-off valve 18b, from returning to parts of the air passageway 12b upstream from the shut-off valve 18b. A pressure setting device 20a, which is constituted of a regulator, and an on-off valve 22a are located in the air passageway 12a upstream from the shut-off valve 18a. The pressure setting device 20a and the on-off valve 22a are located in this order, which order is taken in the upstream direction. Also, a pressure setting device 20b, which is constituted of a regulator, and an on-off valve 22b are located in the air passageway 12b upstream from the shut-off valve 18b. The pressure setting device 20b and the on-off valve 22b are located in this order, which order is taken in the upstream direction.

Figure 2:
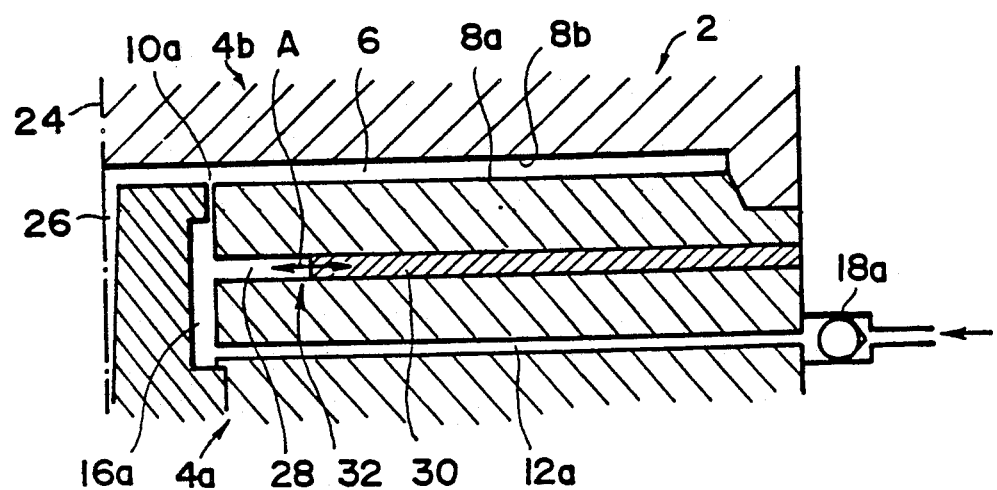
FIG. 2 is a sectional view showing part of the mold shown in FIG. 1.

FIG. 2 is a sectional view showing the configuration of the mold 2. FIG. 2 shows only the part of the mold located on the right side of a center line 24. Also, only the configuration of the fixed mold half 4a is illustrated in detail.

With reference to FIG. 2, the mold cavity 6 is defined by the molding surface 8a of the fixed mold half 4a and the molding surface 8b of the movable mold half 4b. A sprue hole 26, through which a molten synthetic resin is injected into the mold cavity 6, is formed in the fixed mold half 4a and along the center line 24. The air accumulation space 16a is associated with a volume adjusting mechanism 32 which adjusts the volume of the air accumulation space 16a. The volume adjusting mechanism 32 comprises a volume adjusting horizontal hole 28, and a rod 30 inserted in the volume adjusting horizontal hole 28 so that the rod 30 can be moved in the directions indicated by the double headed arrow A. In order to adjust the volume of the air accumulation space 16a, the rod 30 is moved in the directions indicated by the double-headed arrow A.

How the molded synthetic resin product is released from the fixed mold half 4a will be described hereinbelow.

After the mold cavity 6 has been filled with the synthetic resin, the molded product of the synthetic resin is cooled. While the molded synthetic resin product is being cooled in the mold cavity 6, the on-off valve 22a opens, and the air is fed from the air source 14 into the air passageway 12a and the air accumulation space 16a. At this time, the molded synthetic resin product is being pushed by the mold clamping force against the molding surface 8a of the fixed mold half 4a and the molding surface 8b of the movable mold half 4b. Therefore, the air jet opening 10a is closed off by the surface of the molded synthetic resin product. Accordingly, the pressure of the air in the air passageway 12a and the air accumulation space 16a increases. The pressure of the air increases until it reaches a predetermined value which has been set in the pressure setting device 20a. After the pressure of the air in the air passageway 12a and the air accumulation space 16a has reached the predetermined value, the on-off valve 22a is closed by a control means (not shown). The process described above is carried out while the molded synthetic resin product is being cooled in the mold cavity 6 before the fixed mold half 4a and the movable mold half 4b begin opening. The pressure of the air, which has accumulated in the air accumulation space 16a and the parts of the air passageway 12a located downstream from the shut-off valve 18a, is kept by the shut-off valve 18a, which is constituted of the check valve, from returning to parts of the air passageway 12a upstream thereof. Accordingly, the amount and the pressure of the air, which has accumulated in the air accumulation space 16a and the parts of the air passageway 12a located downstream from the shut-off valve 18a, are constant for a plurality of molding shots. The times at which the on-off valve 22a is turned on and off need not be extremely accurate as in the case of the conventional techniques.

After the molded synthetic resin product has been cooled in the mold cavity 6, the mold clamping force, which pushes the molding surface 8a of the fixed mold half 4a and the molding surface 8b of the movable mold half 4b against the molded product, is released in order to open the fixed mold half 4a and the movable mold half 4b. As a result, the molded synthetic resin product is no longer pushed against and no longer closes the air jet opening 10a. Accordingly, the air jet opening 10a is opened, and the air, which has accumulated in the air accumulation space 16a and parts of the air passageway 12a located downstream from the shut-off valve 18a, is jetted instantaneously from the air jet opening 10a to a position between the molded synthetic resin product and the molding surface 8a. The jetted air releases the molded synthetic resin product from the molding surface 8a.

The aforesaid method for releasing the molded synthetic resin product from the mold is effective particularly for the releasing of the molded product from the fixed mold half 4a. However, the aforesaid method for releasing the molded synthetic resin product from the mold may also be employed to release the molded synthetic resin product from the movable mold half 4b. In such cases, simultaneously with the opening of the mold, the molded synthetic resin product can be released both from the fixed mold half 4a and from the movable mold half 4b. In such cases, when the mold has been opened and a take-out means operates to take the molded synthetic resin product out of the mold, the molded synthetic resin product is already released from the mold. Therefore, the molded synthetic resin product may be knocked out with a conventional means, which is mechanical. Alternatively, the air may again be jetted to the molded synthetic resin product in synchronization with the operation of the mechanical take-out means in order to assist the mechanical take-out means.

Experiments were carried out to compare the effects of the embodiment described above with the effects of the conventional mold release method. The results of the experiments will be described hereinbelow. The experiments were carried out for 130mm-diameter optical disk sheets molded with the injection molding process.

(1) Mold release with the conventional method

An air valve was used to release a molded optical disk sheet from a mold, and the turning-on and turning-off of the air valve were controlled with timers in a molding machine. However, because of variation in the molding process, the time at which the air valve was operated deviated by 2/100 second to 3/100 second from the time at which the mold was opened. Also, as long as 3/100 second to 5/100 second was taken for the pressure in the an air passageway in the mold to increase to its maximum value. Additionally, the maximum pressure fluctuated by 5% to 10%.

The shapes of the molded optical disk sheets, after they had been released from the mold, varied by approximately 100μm in terms of the extent of warping.

(2) Mold release with the aforesaid embodiment of the present invention

The mold 2 shown in FIG. 1 was used. For both the fixed mold half 4a and the movable mold half 4b, the conditions described below were used during the mold release operation.

Air setting pressure: 6kg/cm$^2$.

Volume of the air accumulation space 16a and the parts of the air passageway 12a located downstream from the shut-off valve 18a: 30 cc.

Volume of the air accumulation space 16b and the parts of the air passageway 12b located downstream from the shut-off valve 18b: 30 cc.

Time at which the on-off valves 22a and 22b were turned on: Approximately 3 seconds before the mold opens.

Time at which the on-off valves 22a and 22b were turned off: Approximately 1 second before the mold opens.

The pressure of the air in the air passageway 12a and the air accumulation space 16a and the pressure of the air in the air passageway 12b and the air accumulation space 16b reached the predetermined value within approximately 1 second. Also, after the mold was opened, the on-off valve 22b was again turned on in synchronization with the operation of a take-out means in order to shift the molded optical disk sheet from the movable mold half 4b to the take-out means. Thereafter, the on-off valve 22b was turned off.

With this embodiment, the variation in the shape of the molded optical disk sheets after they were released from the mold was not larger than 20μm in terms of the extent of warping.

Experiments using the embodiment of the method for releasing a molded synthetic resin product from a mold in accordance with the present invention were carried out with various predetermined air pressures within the range of 3kg/cm$^2$ to 7kg/cm$^2$. In these experiments, the variation in the warping of the molded optical disk sheets after they were released from the mold was not larger than 50μm. When the air pressure was set lower than 3kg/cm$^2$, the molded optical disk sheet could not be released from the mold. When the air pressure was set higher than 7kg/cm$^2$, the molded optical disk sheet became deformed.

Experiments were also carried out in which the air pressure was set at 6kg/cm$^2$, and the volume of the air accumulation space 16a and the parts of the air passageway 12a located downstream from the shut-off valve 18a, and the volume of the air accumulation space 16b and the parts of the air passageway 12b located downstream from the shut-off valve 18b, were set to various values between 20cc and 50cc. In these experiments, the variation in the warping of the molded optical disk sheets after they were released from the mold was not larger than 50μm. However, when the volume of the air accumulation space 16a and the parts of the air passageway 12a located downstream from the shut-off valve 18a, and the volume of the air accumulation space 16b and the parts of the air passageway 12b located downstream from the shut-off valve 18b, were larger than 50cc, warping occurred in the molded optical disk sheet.

The aforesaid embodiment may be modified in various other manners, for example, in the manners described below.

(1) A gas such as $N_2$ or $O_2$ may be used, instead of air being used.

(2) The volume of the air accumulation space 16a and the volume of the air accumulation space 16b may be fixed. However, these volumes should preferably be adjusted as in the aforesaid embodiment.

(3) When the check valves are used as the shut-off valves 18a and 18b, the air passageway 12a and the air passageway 12b can be closed easily. However, it is also possible to use other types of valves, such as on-off valves, which can control the air, which has accumulated in the air accumulation space 16a and the parts of the air passageway 12a located downstream from the shut-off valve 18a and in the air accumulation space 16b and the parts of the air passageway 12b located downstream from the shut-off valve 18b, in the same manner as the check valves.

(4) One of various other means may be employed in order to control the pressure of the air accumulated in the air accumulation spaces 16a and 16b and the air passageways 12a and 12b. However, when the pressure setting devices 20a and 20b are used, the pressure of the air can be set easily.

I claim:

1. A method for releasing a molded synthetic resin product from a mold wherein a gas is fed through a gas passageway to a position between a molded synthetic resin product, which has been molded in a mold with an injection molding process, and a molding surface of the mold in order to release the molded synthetic resin product from the mold, the method for releasing a molded synthetic resin product from a mold comprising the steps of:

(i) providing a gas accumulation space in which a predetermined amount of said gas is to accumulate and which communicates with said gas passageway, (ii) feeding said gas into said gas passageway and said gas accumulation space until the pressure of said gas in said gas passageway and said gas accumulation space reaches a predetermined value after a cavity of said mold has been filled with a synthetic resin but before said mold is opened, (iii) after the pressure of said gas in said gas passageway and said gas accumulation space has reached the predetermined value and before the mold has opened, closing said gas passageway at a position upstream from where said gas passageway communicates with said gas accumulation space, and (iv) when mold clamping force is released in the course of opening said mold, causing said gas, which has accumulated in said gas accumulation space and the parts of said gas passageway downstream from said position at which said gas passageway has been closed, to be jetted to a position between said molded synthetic resin product and said molding surface of said mold in order to release said molded synthetic resin product from said mold.

2. A method as defined in claim 1 wherein said mold is constituted of a fixed mold half and a movable mold half, said gas accumulation space is located in the fixed mold half, and said gas, which has accumulated in said gas accumulation space and the parts of said gas passageway located downstream from said position at which said gas passageway has been closed, is jetted to a position between said molded synthetic resin product and the molding surface of the fixed mold half.

3. A method as defined in claim 1 or 2 wherein said gas is air.

4. A method as defined in claim 1 or 2 wherein the volume of said gas accumulation space is adjustable.

5. A method as defined in claim 1 or 2 wherein the volume of said gas accumulation space is adjusted with a volume adjusting mechanism which comprises a volume adjusting hole which communicates with said gas accumulation space, and a rod inserted in the volume adjusting hole so that the rod is movable therein.

6. A method as defined in claim 1 or 2 wherein a check valve is used in order to close said gas passageway at a position upstream from where said gas passageway communicates with said gas accumulation space after the pressure of said gas in said gas passageway and said gas accumulation space has reached the predetermined value.

7. A method as defined in claim 1 or 2 wherein a regulator is used in order to set said predetermined value of the pressure of said gas in said gas passageway and said gas accumulation space.

8. A method as defined in claim 1 wherein said molded synthetic resin product is an optical disk sheet.

9. A method as defined in claim 8 wherein said predetermined value of the pressure of said gas in said gas passageway and said gas accumulation space falls within the range of $3kg/cm^2$ to $7kg/cm^2$.

10. A method as defined in claim 8 wherein the volume of said gas accumulation space and the parts of said gas passageway located downstream from said position at which said gas passageway has been closed falls within the range of 20cc to 50cc.

11. A method as defined in claim 2 wherein a second gas accumulation space, in which a predetermined amount of said gas is to be accumulated and which communicates with a second gas passageway, is located in the movable mold half, said gas is fed into the second gas passageway and the second gas accumulation space until the pressure of said gas in the second gas passageway and the second gas accumulation space reaches a predetermined value after said cavity of said mold has been filled with said synthetic resin but before said mold is opened, after the pressure of said gas in the second gas passageway and the second gas accumulation space has reached the predetermined value and before the mold has opened, the second gas passageway is closed at a position upstream from where the second gas passageway communicates with the second gas accumulation space, and when said mold clamping force is released in the course of opening said mold, said gas, which has accumulated in the second gas accumulation space and the parts of the second gas passageway located downstream from the position at which the second gas passageway has been closed is caused to be jetted to a position between said molded synthetic resin product and the molding surface of the movable mold half in order to release said molded synthetic resin product from the movable mold half.

12. A method as defined in claim 11 wherein the volume of the second gas accumulation space is adjustable.

13. A method as defined in claim 11 wherein the volume of the second gas accumulation space is adjusted with a volume adjusting mechanism which comprises a volume adjusting hole which communicates with the second gas accumulation space, and a rod inserted in the volume adjusting hole so that the rod is movable therein.

14. A method as defined in claim 11 wherein a check valve is used in order to close the second gas passageway at a position upstream from where the second gas passageway communicates with the second gas accumulation space, after the pressure of said gas in the second gas passageway and the second gas accumulation space has reached the predetermined value.

15. A method as defined in claim 11 wherein a regulator is used in order to set the predetermined value of the pressure of said gas in the second gas passageway and the second gas accumulation space.

16. A method as defined in claim 11 wherein said molded synthetic resin product is an optical disk sheet, and the predetermined value of the pressure of said gas in the second gas passageway and the second gas accumulation space falls within the range of $3kg/cm^2$ to $7kg/cm^2$.

17. A method as defined in claim 11 wherein said molded synthetic resin product is an optical disk sheet, and the volume of the second gas accumulation space and the parts of the second gas passageway located downstream from the position at which the second gas passageway has been closed falls within the range of 20cc to 50cc.

* * * * *